United States Patent [19]
Hafner et al.

[11] Patent Number: 5,884,319
[45] Date of Patent: Mar. 16, 1999

[54] PORTABLE DATA CARRIER CONFIGURATION TO BE OPERATED ON A DATA BUS AND DATA PROCESSING SYSTEM HAVING AT LEAST ONE PORTABLE DATA CARRIER CONFIGURATION

[75] Inventors: Karlheinz Hafner, München; Sönke Mehrgardt, March, both of Germany

[73] Assignee: Siemens Aktiengesellschaft, Munich, Germany

[21] Appl. No.: 828,538

[22] Filed: Mar. 31, 1997

[30] Foreign Application Priority Data

Sep. 30, 1994 [DE] Germany .......................... 44 35 121.6

[51] Int. Cl.⁶ .................................................... G06F 17/30
[52] U.S. Cl. ............................ 707/104; 361/790; 439/74
[58] Field of Search ......................... 707/104, 3; 29/830; 361/790, 735, 792; 257/686, 785; 439/74

[56] References Cited

U.S. PATENT DOCUMENTS

| | | | |
|---|---|---|---|
| 3,705,332 | 12/1972 | Parks ........................... | 361/795 |
| 3,775,844 | 12/1973 | Parks ........................... | 29/830 |
| 3,813,773 | 6/1974 | Parks ........................... | 29/830 |
| 4,095,867 | 6/1978 | Parks ........................... | 439/329 |
| 4,868,713 | 9/1989 | Banjo et al. ................. | 361/684 |
| 4,922,381 | 5/1990 | Longerich et al. .......... | 361/792 |
| 4,954,875 | 9/1990 | Clements ..................... | 257/686 |
| 5,229,647 | 7/1993 | Gnadinger .................... | 257/785 |
| 5,245,751 | 9/1993 | Locke et al. ................. | 29/852 |
| 5,570,504 | 11/1996 | DiStefano et al. .......... | 29/830 |
| 5,661,087 | 8/1997 | Pedersen et al. ............ | 438/109 |
| 5,673,417 | 9/1997 | Liao ............................. | 711/161 |
| 5,713,747 | 2/1998 | Hsia et al. .................... | 439/79 |
| 5,716,221 | 2/1998 | Kantner ........................ | 439/64 |

FOREIGN PATENT DOCUMENTS

| | | | |
|---|---|---|---|
| 0 265 227 A2 | 4/1988 | European Pat. Off. .......... | G11C 5/00 |
| 0 552 078 A1 | 7/1993 | European Pat. Off. .......... | G06F 12/06 |
| 0 644 548 A2 | 3/1995 | European Pat. Off. .......... | G11C 5/00 |
| 87 00 817 | 4/1987 | Netherlands .................... | G11C 11/34 |

OTHER PUBLICATIONS

"Kommt die Chipkarte nach Deutschland ?", Kurzberichte, vol. 37, 1984, Section 3, pp. 175–176.

"IC–Cards–Neue Aspekte der Informationsverarbeitung " (Vogt), Elektronik 1986, pp. 99–101.

Microsoft Press computer Dictionary, Second Edition (Redmond Washington 1994), p. 294–295.

*Primary Examiner*—Paul R. Lintz
*Attorney, Agent, or Firm*—Herbert L. Lerner; Laurence A. Greenberg

[57] ABSTRACT

Portable data carrier configurations with non-volatile semiconductor memories serve as rapid-access storage media for data processing systems. It is possible for a multiplicity of such data carrier configurations to be operated on a bus system. The data carrier configurations preferably contain a microprocessor which, for example, automatically creates an index file of files stored in the data carrier configuration and also searches for certain terms and actively or passively reports a search result on request from a PC or a microprocessor provided in a receiving adapter for the data carrier configurations.

2 Claims, 1 Drawing Sheet

5,884,319

PORTABLE DATA CARRIER CONFIGURATION TO BE OPERATED ON A DATA BUS AND DATA PROCESSING SYSTEM HAVING AT LEAST ONE PORTABLE DATA CARRIER CONFIGURATION

CROSS-REFERENCE TO RELATED APPLICATION

This application is a Continuation of International Application No. PCT/DE95/01340, filed Sep. 27, 1995.

BACKGROUND OF THE INVENTION

Field of the Invention

The invention relates to a portable data carrier configuration having an electrically programmable, non-volatile semiconductor memory, to which access can be made through contact areas on surfaces of the data carrier configuration. The invention also relates to a data processing system having at least one portable data carrier configuration.

In modern data processing systems, data are stored on digital storage media. In such cases, short-term storage takes place on hard disks or floppy disks and long-term storage takes place on floppy disks, magnetic tapes or magneto-optical disks. In those cases, filing of the storage media takes place in a conventional way in an archive. The disadvantage of such conventional storage is that the older, filed data are not on-line and consequently are not directly accessible. In addition, with that type of archiving it is necessary to keep a directory which gives information about on which of the filed copies the data being sought are stored. That copy must then be removed from the archive and be loaded into a suitable player. Complex and consequently very expensive archiving systems are constructed like a jukebox and accomplish the removal and loading automatically. However, even in those systems, a long time elapses before the data are available.

Published European Patent Application 0 552 078 A1 discloses a plug-in card for a microcomputer, which forms a reading device for chip cards with planar contacts. The plug-in card can be connected to a PCMCIA terminal of the microcomputer and has additional contacts at its upper side, which serve for electrically bonding the contacts of the chip card by the latter being placed onto the plug-in card. The chip card may be a credit card, for example.

SUMMARY OF THE INVENTION

It is accordingly an object of the invention to provide a portable data carrier configuration to be operated on a data bus and a data processing system having at least one portable data carrier configuration, which overcome the hereinafore-mentioned disadvantages of the heretofore-known devices of this general type and in which even data that were stored a considerable time ago can be retrieved again very quickly and automatically on the data carrier configuration. It is a further object of the invention to construct the data processing system in such a way that stored files are searched through automatically for certain data and those data are stored, for example, in an index file.

With the foregoing and other objects in view there is provided, in accordance with the invention, a portable data carrier configuration, comprising a surface; an electrically programmable, non-volatile semiconductor memory; and a contact area on the surface for accessing the memory, for contacting an adjacent portable data carrier configuration upon laying portable data carrier configurations one on top of the other and for contacting a bus system to operate a multiplicity of portable data carrier configurations on the bus system.

The portable data carrier configuration may be realized, for example, by a chip card having an electrically programmable, non-volatile memory, in which a device is provided in order to operate a multiplicity of such portable data carrier configurations on a bus system.

The non-volatile memory in this case may be constructed in such a way that it can be written to by the user once or more than once.

It is an advantageous development of the portable data carrier configuration according to the invention that contact fields are disposed on surfaces of the data carrier configuration in such a way that when such portable data carrier configurations are laid one on top of the other a contact is possible with the respectively neighboring portable data carrier configurations and at the same time with the bus system.

In accordance with another feature of the invention, there is provided a device in the portable data carrier configuration which permits a search for certain data in the non-volatile memory.

In accordance with a further feature of the invention, the searching device is formed by a microprocessor.

In accordance with an added feature of the invention, the searching device automatically searches for certain data and stores them in given files in the non-volatile memory.

In accordance with an additional feature of the invention, there is provided a device for archiving data.

With the objects of the invention in view there is also provided a data processing system having at least one adapter each for receiving at least one portable data carrier configuration according to the invention, the adapter being connected to a bus system of the data processing system.

In accordance with yet another feature of the invention, the receiving adapter also contains a microprocessor.

The currently occurring data of the data processing system are stored automatically or manually in the memory of a data carrier configuration inserted into the receiving adapter. If the data carrier configuration, which is referred to below as chip card, is full, it is removed and a new, empty chip card is pushed in. The recorded-on chip card is pushed into a further adapter for chip card stacks. In this device, many cards are simultaneously connected on-line, with the device itself being connected to the data processing system directly or through a data network. It is also possible to dispense with the receiving adapter for an individual chip card which is to be written to and with manual transfer of the written-to chip card into the chip card stack adapter. Instead, apart from the recorded-on chip cards, empty chip cards must then also be provided in the connected chip card stack adapter, which are automatically and successively used for current data storage.

In accordance with a concomitant feature of the invention, the data carrier configuration has a microprocessor, the microprocessor of the adapter is a master processor and the microprocessor of the data carrier configuration is a slave processor.

The search for archived data may take place through the use of a central control unit, which may be realized, for example, by a microprocessor along with a program memory, in the stack adapter. In this case, all of the cards are searched through one after the other by this master processor. However, to speed up this operation, which under certain circumstances may take a very long time, each chip card may also be provided with its own local search logic, which may likewise be realized by a microprocessor along with a program memory. Search inquiries are then passed on by the master processor simultaneously to all of the connected chip cards, for example by broadcasting the search inquiry. The slave processor of each chip card then searches through the local data memory. The slave processor either actively or passively reports back hits when requested to the master processor, which in turn passes on the result to the inquiring central computer of the data processing system. If, for performance reasons, no dedicated master processor is required, its tasks may also be assumed by the central processor of the data processing system.

If the slave processor is realized by a microprocessor along with a mask-programmed ROM or loadable RAM program memory, great flexibility of construction and use is obtained at the same time as low effort for construction. A dedicated circuit configuration can also be constructed for this purpose with a more simple, permanently given repertoire of search inquiries, such as, for example, string matching with strings of a given maximum length or regular expression matching with regular expressions of a given maximum complexity. This minimizes the amount of chip surface area required. In cases of very high performance requirements and very complex search queries, realization with stored-program PLD structures could also be used.

In order to provide for the speeded-up handling of search inquiries, the slave processors can create special data structures which support this task. Such data structures may, for example, be index lists of key words or inverted lists, etc. Reserved memory areas are to be provided therefor on the chip card. The type and organization of these data structures in this case are expediently specified by the master processor, and creating can take place autonomously by the slave processors, for example in phases when the volume of jobs is low.

The protocol between master processor and slave processor may be established on various levels. First of all, a certain repertoire of search inquiries and management operations may be defined, which the slave processor can execute autonomously. Command transfer from the master processor to the slave processor can then take place in accordance with the customary schema for peripheral components in computers. Successful processing can also be notified according to one of the customary schemata. Active reporting back or passive reporting back after polling by the master processor come into consideration in this case. In active reporting back, the respective chip card makes it known on a line provided for this purpose that it has a search hit. In order to provide faster identification of the chip card by the master processor, the reporting-back indication expediently also contains its identity in analogy with the vectorized interrupt in computers. In the case of polling, the master processor interrogates all of the chip cards one after the other for the search result. In response, the cards report back the search status and, if appropriate, the search result.

A more general protocol between master processor and slave processor follows the schema of channel processors in mainframe computers. In that case, no repertoire of search queries is predefined, but rather the master processor sends the search program to be executed to the slave processor in a suitable programming language, such as, for example, Assembler or SQL, etc. The sequence then continues an analogy with the first alternative. In comparison with the latter, greater flexibility and immanent expandability of the search repertoire are obtained in this case.

Other features which are considered as characteristic for the invention are set forth in the appended claims.

Although the invention is illustrated and described herein as embodied in a portable data carrier configuration to be operated on a data bus and a data processing system having at least one portable data carrier configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
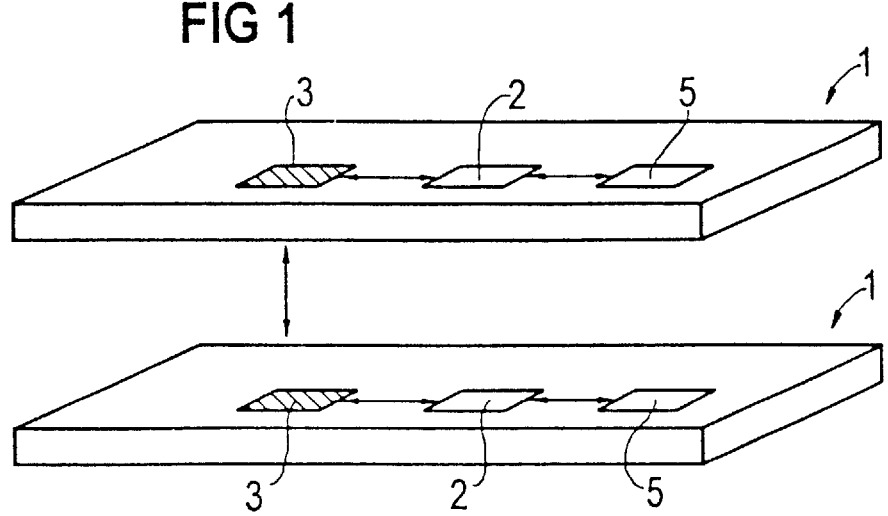
FIG. 1 is a diagrammatic, exploded perspective view of two a portable data carrier configurations according to the invention.

Referring now to the figures of the drawings in detail and first, particularly, to FIG. 1 thereof, there are seen two data carrier configurations 1 according to the invention which can be placed on top of each other. Each one of the data carrier configurations 1 has a contact area 3 on a surface thereof, through which a semiconductor memory 2 can be accessed. The data carrier configurations 1 furthermore each have a searching device 5 for searching certain data in the memory 2. A vertical arrow in FIG. 1 indicates the ability to place the two data carriers 1 on top of each other, while horizontal arrows indicate an electrical connection between the contact area 3, the memory 2 and the searching device 5.

Figure 2:
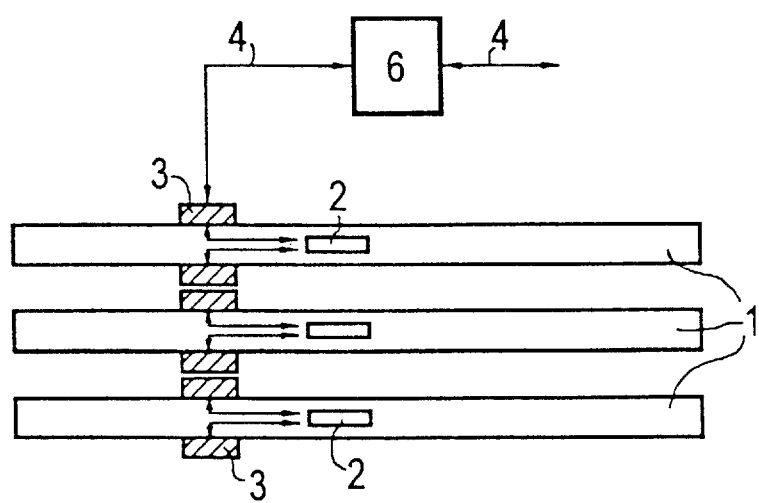
FIG. 2 is a side-elevational view of three data carrier configurations according to the invention.

FIG. 2 illustrates three data carrier configurations 1 according to the invention, which are placed on top of each other in such a way that a contact to the respective neighboring or adjacent data carrier configurations through the contact area 3 is produced. Furthermore, above the uppermost contact area 3, there is indicated a possibility of connecting a bus system 4 through an adapter 6.

We claim:

1. A data processing system, comprising:

at least one portable data carrier configuration having a surface, an electrically programmable, non-volatile semiconductor memory, and a contact area on said surface for accessing said memory and for contacting an adjacent portable data carrier configuration upon laying portable data carrier configurations one on top of the other;

a bus system contacting said contact area for operating a multiplicity of portable data carrier configurations on said bus system; and an adapter having a microprocessor connected to said bus system.

2. The data processing system according to claim 1, wherein said data carrier configuration has a microprocessor, said microprocessor of said adapter is a master processor and said microprocessor of said data carrier configuration is a slave processor.

* * * * *

UNITED STATES PATENT AND TRADEMARK OFFICE
CERTIFICATE OF CORRECTION

PATENT NO.   : 5,884,319
DATED        : March 16, 1999
INVENTOR(S)  : Karlheinz Hafner, et al It is certified that error appears in the above-identified patent and that said Letters Patent is hereby corrected as shown below:

On the title page, insert the following item: -- [63] Continuation of Ser. No.828,538 filed Mar. 31, 1997, which was the national stage of international application number PCT/DE95/01340, filed Sept. 27, 1995. --

Signed and Sealed this

Twelfth Day of October, 1999

Attest:

Q. TODD DICKINSON

*Attesting Officer*

*Acting Commissioner of Patents and Trademarks*